United States Patent [19]

Fawcett

[11] 3,973,755
[45] Aug. 10, 1976

[54] HAND OPERATED WINCH

[75] Inventor: Derek James Fawcett, Havant, England

[73] Assignee: Lewmar Marine Limited, Havant, England

[22] Filed: Dec. 13, 1974

[21] Appl. No.: 532,601

[30] Foreign Application Priority Data

Dec. 19, 1973 United Kingdom............... 58878/73
Feb. 26, 1974 United Kingdom................. 8687/74
May 10, 1974 United Kingdom............... 20876/74

[52] U.S. Cl................................ 254/150 R; 74/812
[51] Int. Cl.².......................................... B66D 1/30
[58] Field of Search ..... 254/150 R, 186 R, 186 HC, 254/187 R; 114/218; 74/812, 810, 750 R, 202

[56] References Cited
UNITED STATES PATENTS

| | | | |
|---|---|---|---|
| 1,608,978 | 11/1926 | Gilman............................ | 254/150 R |
| 3,728,914 | 4/1973 | Guangorena..................... | 254/150 R |
| 3,802,665 | 4/1974 | Fawcett........................... | 254/150 R |

*Primary Examiner*—Frank E. Werner
*Assistant Examiner*—Kenneth Noland
*Attorney, Agent, or Firm*—Bacon & Thomas

[57] ABSTRACT

In a multi-speed winch which has automatic uncoupling of a first drive ratio when drive input is reversed, an actuator can have an uncoupling position or one in which the first drive ratio is engaged. The actuator is resiliently urged towards the latter position so that when released from a detent which holds it in the uncoupling position it is driven to adopt the engagement position. The operator of the winch therefore does not move the actuator to the engagement position but merely is provided with means for releasing it. Reversal of the drive input when the actuator is in the engagement position causes return of the actuator to the uncoupling position, against its resilient urging. The first drive ratio is usually a 1:1 drive.

16 Claims, 15 Drawing Figures

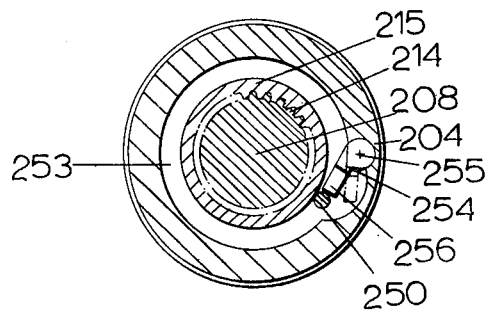
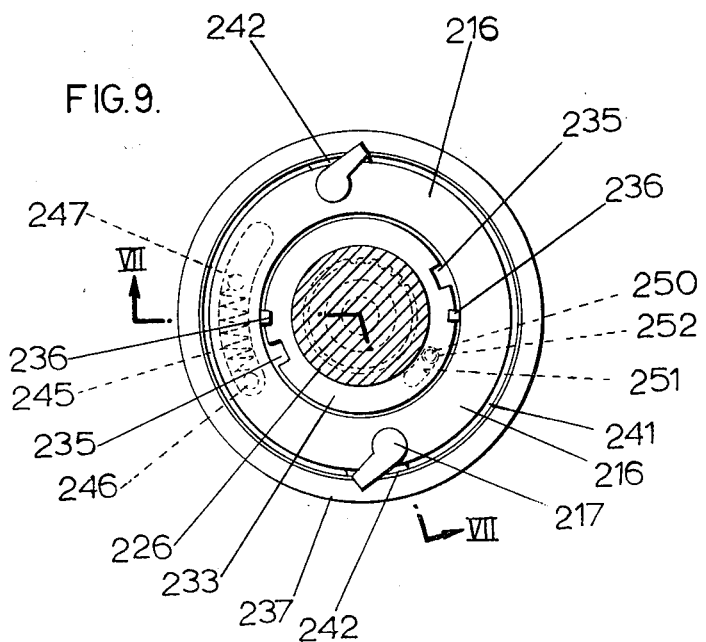
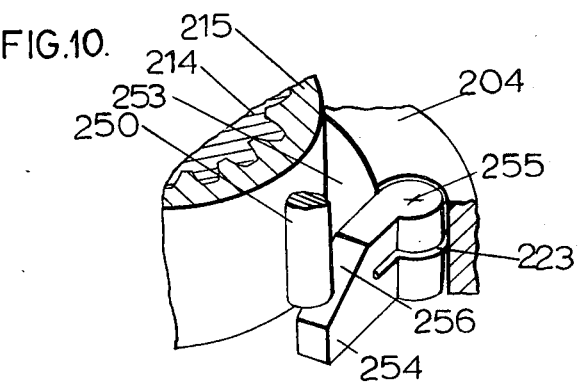

HAND OPERATED WINCH

FIELD OF THE INVENTION

This invention relates to winches particularly sheet winches for sailing vessels, of the type where there is a plurality of drive ratios available between a central drive shaft and the winch drum, in which the drum is rotated always in one direction but with different drive ratios from the drive shaft when the drive shaft is successively rotated in successively opposite directions without manual gear-changing or selection interventions once the initial ratio has been chosen. They will be referred to as multi-speed winches of the type described.

BACKGROUND OF THE INVENTION

Developments in this type of winch include the disclosure in U.S. Pat. No. 3,728,914 wherein in order to allow the use of three ratios, one of them a direct coupling between a drive handle and the drum to give a 1:1 drive, the direct coupling is automatically disengaged when there is relative rotation between the drum and the handle when relative rotation occurs which can represent a reversal of rotation of the drive handle. Once this automatic disengagement has occurred then if the shaft is reversed once again it is not the 1:1 drive which is engaged but the third drive ratio. However, the arrangements there disclosed have the disadvantage that they only take account of the relative directions of rotation of the drum and of the handle, so that if during the time the direct drive is engaged, the drum overruns the disengagement occurs. This which quite often happens (in the operating condition known as sheet-tailing) is very undesirable.

In a prior U.S. Ser. No. 413254 now U.S. Pat. No. 3,927,580 we have shown a winch of the type described wherein however pre-selection of whether a first ratio or a third ratio is going to be engaged on a given rotation of the drive shaft is determined automatically and with reference to the absolute direction of rotation of the drive shaft; i.e., such a winch does not have its first ratio disconnected if the drum overruns.

SUMMARY OF THE INVENTION

In the present invention we are concerned with an improved way of achieving pre-selection involving a resiliently pre-loaded cocking mechanism within the winch.

According to the invention we provide a multi-speed winch of the type described wherein a first ratio drive is engageable unidirectionally between a drive shaft and a drum or held uncoupled in accordance with the relative position of a resiliently loaded actuator which is resiliently loaded towards an engagement position in which there will be engagement of the unidirectional first ratio drive but is releasably held by a detent in an uncoupling position where there is uncoupling of the first ratio drive, and means accessible to the operator of the winch for releasing the actuator from the detent to be moved by the resilient loading towards the engagement position, the winch further including a catch on a stationary portion of the winch for engaging the actuator only when the actuator moves with the drive shaft in one direction and is in its engagement position and urging it relative to the shaft and against its resilient loading towards its uncoupling position in which the first ratio drive is held uncoupled and it is held by the detent, in which uncoupling position the actuator becomes disengaged from the catch.

Thus the relative movement of the actuator towards its uncoupling position occurs only as a result of reversal of the direction of rotation of the shaft and irrespective of the behaviours of the drum. It also results in an increase in potential energy in the means resiliently loading the actuator, which energy is released or partly released in moving the actuator next to its engagement position.

The first ratio drive will usually be the highest ratio drive, i.e., that offering the least mechanical advantage to the operator of the winch. This will usually be a 1:1 ratio. This is because initial winding is done at the highest possible speed and no very high tensions are encountered: to engage such a drive the operator merely has to touch the push button (a preferred accessible means) so that the actuator is moved, by its resilient loading, into the desired position. The operator does not at that time supply the energy to move the actuator; it is moved for him by the resilient loading means: this is later restored to a condition of heightened potential energy by a reversal in the direction of rotation of the drive shaft.

The push button may be coaxial with the drive shaft, or eccentric of that axis.

The actuator may execute an axial and rotational movement between its uncoupling and engagement positions but preferably only a rotational one.

DESCRIPTION OF DRAWINGS

Particular embodiments of the invention will now be described with reference to the accompanying drawings wherein:

FIG. 8 is a section on the line VIII—VIII FIG. 7, FIG. 9 is a section on the line IX—IX FIG. 7, FIG. 10 is a sketch perspective view of a non-return catch, FIG. 12 is a radial section taken as a plane at right angles to that in which FIG. 7 is drawn.

DESCRIPTION OF PREFERRED EMBODIMENTS

Figure 3A:
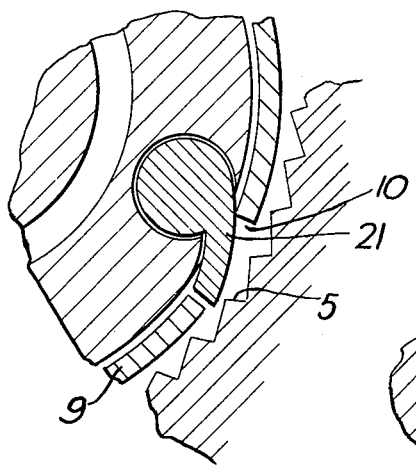
FIGS. 3a and b are sections on the line III—III FIG. 2 showing parts of the embodiment in engaging and uncoupled positions respectively.
Figure 3B:
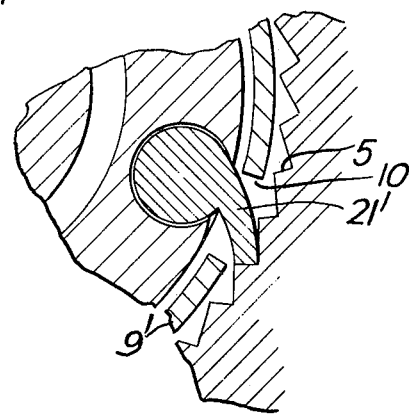

The first embodiment of winch has a stationary casing or frame 1 within which is journaled a main drive shaft 2 which has at its upper end an enlarged portion 3 in which a plurality of housings 4 (only one is shown) each receive a pivotal pawl 21 (FIG. 1) which is for unidirectional 1:1 driving engagement, in one direction of rotation of the shaft 2, with a circular ratchet track 5 on an inside cylindrical face of a drum 6 of the winch. Completely conventional drive trains for two other drive ratios are provided by gear trains generally indicated at 22 and linking the drive shaft 2 and the drum 6. Over the enlarged portion 3 of the shaft fits an actuator in the form of a cap 7 which is resiliently loaded upwardly and in an anti-clockwise direction relative to the shaft by means of a torsion-compression spring 8. A depending skirt 9 of the cap 7 has apertures 10 in it through each of which can penetrate a respective pawl 21 from a housing 4 so as to engage ratchet track 5. Also provided in the skirt and generally L-shaped slots 11 preferably diametrically opposed from each other on the walls of which abuts a diametrical pin 12 fast with the enlarged portion 3. The L-shapes of the slots 11 are arranged with the major limb lying normal to the axis of the shaft 2 and nearer an end plate 13 of the cap, with the minor limb of the L directed generally parallel to the axis and further away from the end plate 13. The arrangement and relationship between the slots 11 and apertures 10 is such that when the pin 12 is housed in the slot 11 in the position shown, i.e., at the further (lower) extremity of the shorter leg of the L the pawls are respectively engaged by end walls of the apertures 10 and are pivoted slightly inwardly so that they are held clear of the ratchet track 5 (FIG. 3a). If however the cap 7 is depressed, i.e., moved towards the shaft 2 so that it can be rotated anti-clockwise relative to the shaft to a position 9', FIG. 3b, then the walls of the apertures 10 come clear of the pawls and they can extend outwardly to a position 21', FIG. 3b, under the influence of their springs, and engage the ratchet track. This depression and rotation of the cap 7 to cause engagement of the direct drive can be carried out in a single action by the operator of the winch by depressing either of two knobs 14 which penetrate a stationary top plate 15 of the winch, being borne on a slip ring 16 which has diametrically opposed noses 17 on its lower face which engage the end face 13 of the cap 7. If either of these knobs 14 is depressed, i.e., pushed inwardly of the winch then the projection 17 is depressed and will push the cap downwardly, compressing the spring 8 axially, so that the pin 12 is free to travel into the longer leg of the L-shaped slot 11. That it does travel up the extremity of that long leg is due to the torsional action of the cocking spring 8 tending to turn the cap anti-clockwise relative to the shaft. Although the slip ring 16 is rotationally stationary and the cap 7 rotates with the shaft this action will be assured within at very most half of a revolution of the shaft as a slot 11 passes under the projection 17, and it can be detected by feel or by ear.

So that there will be automatic disengagement of the pre-selected direct drive when the drive shaft is reversed (but not merely if the drum overruns) there is a unidirectional catch 18 in the form of a spring-loaded ramp mounted in a ring 19 fast with the stationary casing 1. This engages the lowermost edge 20 of the cap so that on the appropriate rotation of the shaft in an absolute sense, here anti-clockwise, the stationary ramp engages the cap and pushes it clockwise relative to the shaft so that the pin 12 is brought into a position where under the compressive (axial) action of the spring 8 it can come to the end of the shorter leg of the L-shaped slot this having three effects; firstly the moving of the edge of the apertures 10 into a position where they interfere with the pawls 21 and prevent engagement between the pawls and the ratchet track 5; secondly the torsional re-cocking of the spring and thirdly the bringing clear of the bottom edge 20 from the spring-loaded ramp forming the catch 18.

The second embodiment compared to the first differs principally in that a different form of actuator is shown which executes only rotational movements and not the axial and rotational movements of the actuator 7 and wherein therefore the detent means can be simpler, taking in the present embodiment a form of a stud engageable under resilient urging in a detent recess in a top cap of the winch, release means for the operator taking the form of a push-button entering into the detent recess and able to dislodge the stud from the recess. The present embodiment also shows how engagement between the uni-directionally acting catch on the stationary portion of the reel may be indirect, via a uni-directionally rotatable camming ring engageable with a portion of the detent stud.

Figure 4:
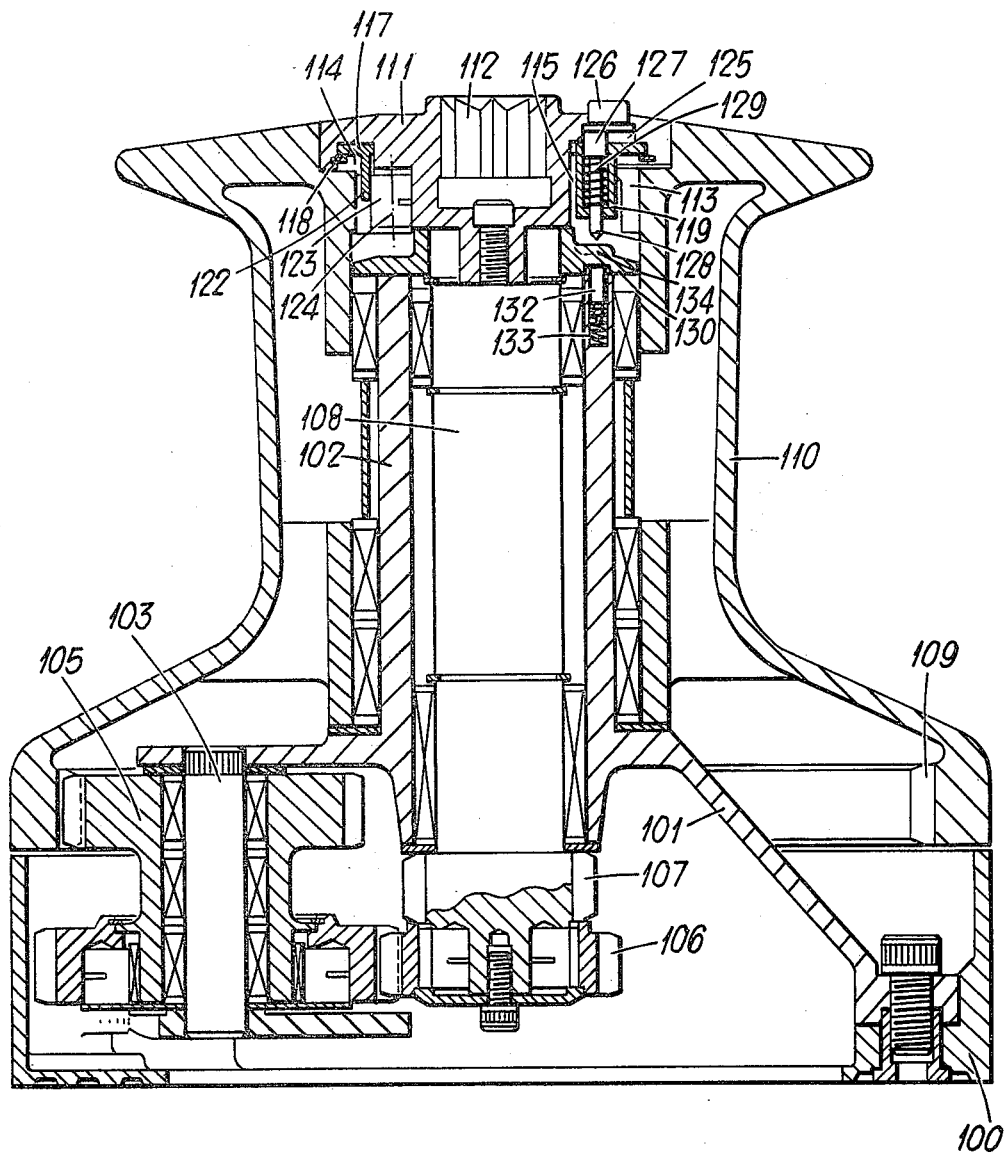
FIG. 4 is a section on two radii through a second embodiment in an uncoupled condition.
Figure 5:
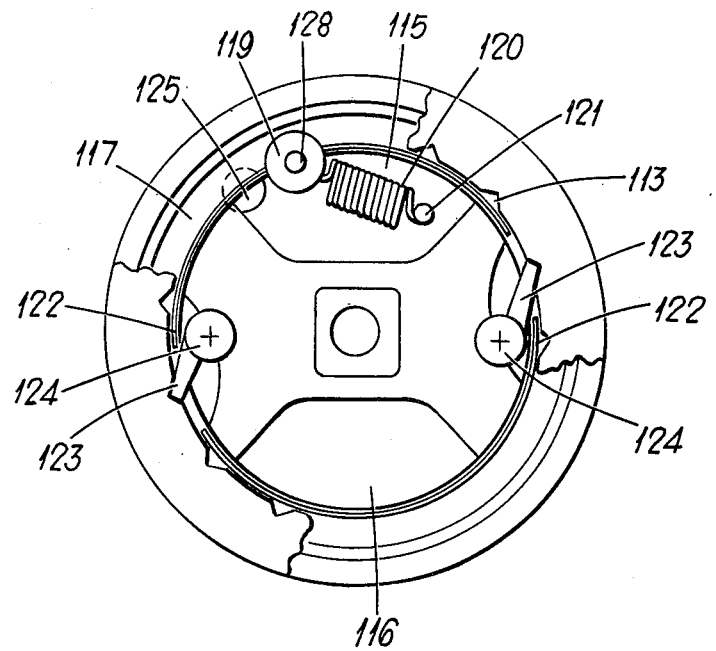
FIG. 5 is an underneath plan view of a cap portion of the second embodiment in an engagement position.
Figure 6:
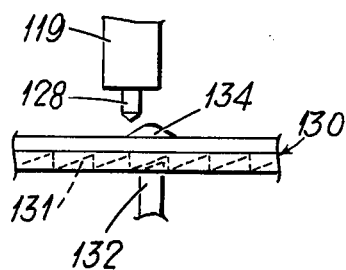
FIG. 6 is a detail scrap side view.

In FIG. 4 the winch has a base 100 for screwing to a deck or the like, out of which rises a casing 101 having a cylindrical stem 102. In the casing are journaled two axles only one of which 103 is shown on which are respectively mounted double gears, the one shown being generally designated 105, which transmit drive from one of two pinions 106, 107 on a central drive shaft 108 to an internal gear-ring 109 on a rotatable drum 110 of the winch. The gearing transmission arrangements are completely conventional in the present winch, as they are also in the first embodiment, and are such that when the shaft 108 is rotated in one direction then drive is transmitted through one gear train, e.g., pinion 106, double gear 105 and gearing 109 whereas if the shaft is rotated in the other direction the drive is transmitted through pinion 107 through the double gear (not shown) on the other axle and thence through the double gear 105 and gearing 109. The gear trains include conventional uni-directional drive devices. Since these gear trains have different numbers of stages and in total different tooth ratios the effect will be that the drum 110 is driven at successively different speed ratios compared to the drive shaft when the drive shaft is successively turned in opposite directions, the drum continuing to rotate in the same direction at all times. A third drive ratio is provided by a 1:1 drive, the selective engagement and disengagement of which we are concerned with in this embodiment.

In the present embodiment the drum 110 has a top cap 111 having a splined central bore 112 into which a handle shaft can be fitted for driving the drum (alternatively drive can be brought in from the base of the drum to be transmitted to the shaft 108) and there is an internal ratchet tooth ring 113 lying immediately below and within the marginal portion of the cap 111. The cap 111 is splined rigidly to the shaft 108 to rotate with it. Within the cap and on its undersurface there is an annular recess 114 which includes also radially enlarged cut-out portions 115 and 116 (FIG. 2), and an actuator ring 117 held in by a circlip 118 so that it can rotate relative to the cap 111.

Figure 2:
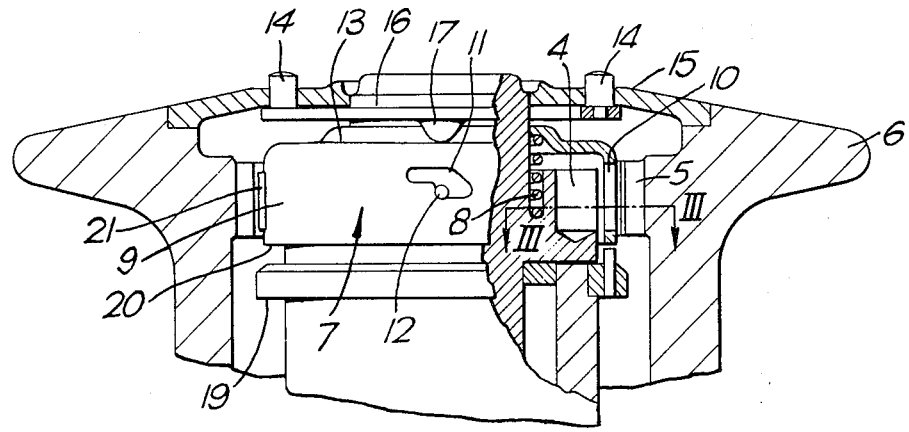
FIG. 2 is a side view, partly cut away, of a part of the first embodiment.

There is a hollow column 119 integral with the ring 117 which can rotate (about the central axis of the winch) within the enlarged recess 115. A tension spring 120 is anchored at one of its ends 121 to the cap 111 and at the other to the column 119 so as to resiliently urge the ring 117 always in one rotational sense relative to the cap 111. The cap 117 also has on it two downwardly projecting walls 122. The walls 122 have ends to act on pawls 123 pivotally mounted about respective axes 124 on the end cap 111 and which are resiliently urged towards the radially outer position. In this radially outer position they engage in the ratchet track 113 for uni-directionally driving the ratchet track 113 and hence the drum 110 from the cap 111 which, it will be recalled, is fast with the main drive shaft 108. However the resilient loading of the pawls 123 allows the shaft 108 to rotate in one direction relative to the drum against only clicking resistance from the pawls. The walls 122 may however be positioned to carry the pawls 123 at all times clear of the ratchet track 113 upon rotation of the actuator ring 117 against the tension of the spring 120 (anti-clockwise as shown in FIG. 2) so that the edges of the walls 122 come tangentially up against the outer edge of the pawls 123 and pivot them radially inward. The limit of this movement is when the column 119 comes up against the appropriate edge of the enlarged recess 115 when it lies underneath a recess 125 in the cap 111. In this recess 125 is positioned a flanged push-button 126, depressible in an exactly axial direction or upon a hinge at one edge of the recess.

The column 119 has within it a stud 127 of which the enlarged head can enter into the recess 125 and lie immediately under the flange of the push button 126. The stud has attached to it a stem 128 which projects downwardly out through the bottom of the column 119. A spring 129 urges the stud upwardly.

At the head of the stationary cylinder 102 of the casing there is mounted on the drive shaft 108 and for free rotation about it a camming ring 130 which has a ratchet track 131 in its under-surface which is engaged by a pin 132 housed in the top end of the cylinder 102 and resiliently urged upwardly by spring 133. Thus the ring 130 may rotate against only clicking resistance in one direction (whatever direction the drum or drive shaft are rotating) but is prevented from rotation in the other direction by the pin 132. At its upper surface the ring 130 has camming ridges 134 which are for engagement in a manner which will be described with the bottom end of the stem 128 when the stud and its stem are in a depressed position.

The effect of the spring 120 is to bias the actuator ring 117 in a direction such that the walls 122 are free of the pawls 123 and they are free to pivot outwardly under the influence of hairpin springs (not shown) to engage the ratchet track 133. The stud 127 is urged resiliently upwardly by spring 129 and so when it is brought into the register with the recess 125 it flies upwardly into the recess and, by lying against a sidewall of the recess, forms a detent for the ring 117; and when it is thus positioned the walls 122 are bearing against the pawls 123 and holding them permanently uncoupled from the ratchet track (FIG. 4).

Assuming the detent to be engaged in that way the operator wanting to use the winch would usually want to engage his 1:1 drive ratio first as being the drive which involves the least mechanical advantage out of the three provided. He therefore depresses the push button 126. This pushes the stud 127 out of the detent recess 125 and under the influence of the spring 120 the ring 117 rotates until the walls 122 are free of the pawls 123 and the spring 120 is under substantially no tension. The stem 128 of the stud 127 projects downwardly and, when the stud 127 is out of the recess 125, is in a path which interferes with the cam ridges 134. When the shaft 108 is driven in a direction appropriate to driving the drum 110 through the pawls 123 then the engagement of the stem 128 and ridge 134 causes free rotation of the ring 130. If however the drive direction of the shaft 108 is reversed then the stud 128 traverses the upper face of the ring 130 until it meets the next camming projection and it tends to drive the ring by its abutment with that projection in the opposite sense to that which it was moving in before. However such rotation is prevented by the ratchet track 131 and the pin 132 and therefore continued rotation of the shaft 108 causes an arresting of rotation of the ring 117, until, as the cap 111 continues to rotate over the arrested ring 117, the stud 127 and the recess 125 comes into register. This relative rotation of cap and ring extends the spring 120 and accumulates potential energy in it. The stud 127 moves upward into this recess under the urging of the spring 129 and of the inclination of the cam ridge 134. The upward movement releases the end of the stem 128 from interference with the rigid 134. The ring is thus cocked in a position in which the pawls 123 are held free of the ratchet ring 113, ready for release only when the button 126 is depressed, i.e., the release of the ring 117 to cause engagement of the pawls is independent of the directions of rotation, absolute or relative, of the drum and the drive shaft and its movement to the uncoupling condition depends only on the direction of rotation of the drive shaft.

In the second embodiment the means for moving or releasing the actuator included a push button accessible to the operator but which was eccentric of the axis of the winch as a whole. It could therefore be difficult for the operator to find, even though it would always be in a given position relative to a drive handle for the winch.

In the third embodiment of the present invention we show a further improved form of actuator mechanism in that the push button is disposed on the axis of the winch as a whole so that it is easily locatable by the operator.

The winch 201 has a drum 202 mounted by means of rolling bearings 203 for rotation on a vertical axis about a cylindrical stem 204 of a domed casing 205 of which a base part 206 is mounted on a deck 207. Within the stem 204 is a main drive shaft 208, mounted by rolling contact bearings 209 at the top of the stem and 210 in a floor plate 211 of the base portion 206 of the casing, so as to be able to rotate about a vertical axis coaxially with that of the drum. In this particular embodiment drive is brought in radially of that axis through an input drive shaft 212 whence it is taken via a crown gear pair 213 to the main drive shaft 208.

At the head of the main drive shaft 208 there is a splined portion 214 to which is fitted a splined sleeve 215 of a pawl ring 216 in which are mounted pawls 217 (FIG. 9) which are spring loaded resiliently outwardly by hairpin springs 223 so that they are urged into engagement with ratchet teeth on a ratchet track 237 which is secured to a top cap 218 of the drum and which is in turn secured fast to the drum 202 by massive screws such as 219. Thus there is provided a path for the transmission of 1:1 drive from the main drive shaft 208 to the drum 202.

At its lower end the main shaft 208 carries pinions 220, 221 which are take-offs for alternative uni-directional drain trains of different transmission ratios and of different number of stages to transmit drive to the drum through respective gear trains terminating in internal gear teeth 222 on the drum. The arrangement shown in this drawing is a novel and inventive gear drive system which has, as before, second and third drive ratios through respective gear trains but which permits also reversal of the drum upon a third reversal of the drive shaft, but it is to be realized that the nature of drive trains installed for the transmission of different ratios of drive from the main drive shaft to the drum upon reversal of rotation of the drive shaft is entirely immaterial to, and forms no part of, the present invention which is solely concerned with the means used for causing automatic uncoupling of the first drive ratio. Therefore any form of gear drive mechanism may be used for the speed ratios other than 1:1 between the drive shaft and the drum within the present invention such as are known in the prior art or such as have been described earlier in this specification.

Turning now to the 1:1 drive mechanism of the winch, at the centre of the top cap 218 there is an aperture in which is fitted a hollow plug 225 within which is axially and rotatably slidable a push button 226, sealed to the top cap by O-ring 227 to prevent ingress of water.

The button has a lower cylindrical portion 228 which is axially and rotationally slidable within a bore 229 in the head of the main drive shaft 208, it being spring loaded upwardly by spring 230 also received in that bore. Extending downwardly from the bore 229 is a narrower bore 231 which is for receiving a push rod 232 which is for influencing the coupling or uncoupling of the various gear drives, and is not concerned with the 1:1 drive coupling and uncoupling which we are here concerned with.

Figure 1:
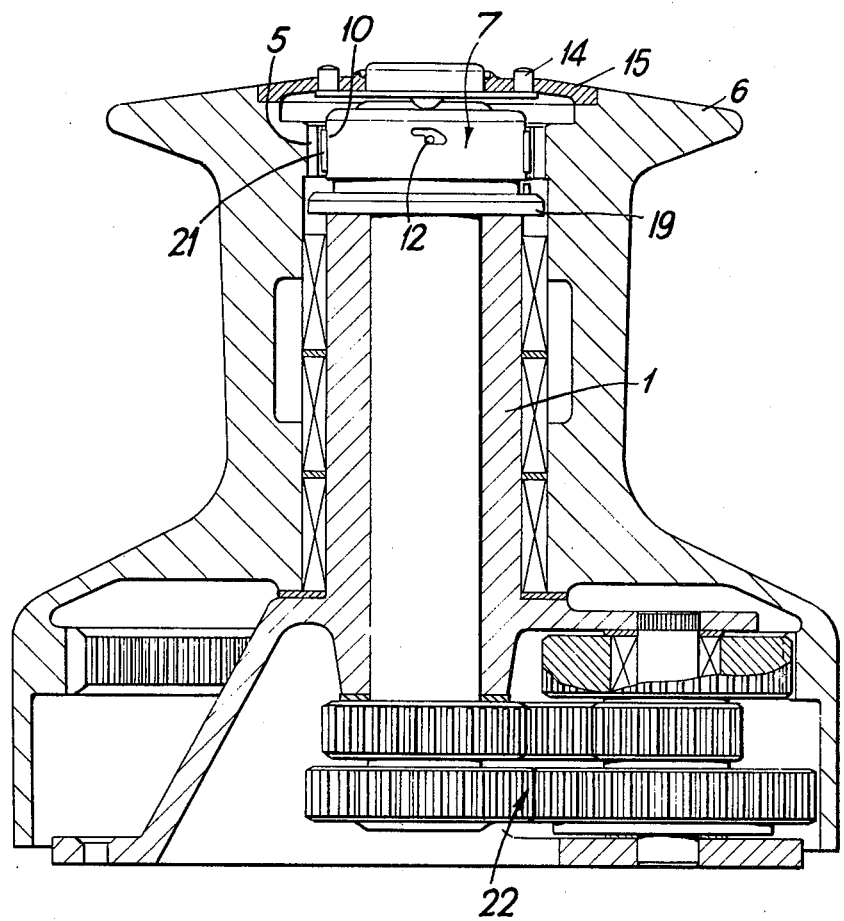
FIG. 1 is a diametrical section through a first embodiment.

A flange 233 of the push button fits radially within the pawl ring 216. It has a planar upper face 234 which is interrupted at its radially outer periphery by a pair of diametrically opposed slots 235 which are for the reception of radially inwardly projecting end portions 236 of pins 237 mounted in the pawl ring to lie in a plane normal to the axis of the winch. It can be seen therefore that when the slots 235 are brought into register with the projecting portions 236 of the pins the button will be free to move upwardly compared to the position which is shown in FIG. 1, where the pin portions 236 are engaging the generally planar upper surface 234 of the flange 233 of the button.

An acutator for permitting engagement or causing disengagement between the pawls 217 and ratchet 237 consists of a ring 240 rotatably mounted about the sleeve portion 215 of the pawl ring 216 so as to underlie that ring and which has an upstanding cylindrical skirt portion 241 which surrounds the lower part of the outer periphery of the pawl ring 216. However the skirt 241 is interrupted at two diametrically opposed parts by apertures 242 (FIG. 3) large enough to permit the pawls to project outward, when those apertures are appropriately positioned. If however the apertures are moved by relative rotation of the ring 214 against the pawl ring 216 (this relative rotation would be clockwise as seen in FIG. 9) one edge of the skirt 241 defining one end of the aperture 242 comes up against the radially outer face of the respective pawl and pushes it inwards about its pivot axis so that it is held out of engagement with the teeth of the ratchet ring 237.

The ring 214 is however held biased towards an anticlockwise direction of rotation relative to the ring 216 by means of a tension spring 245 extending between a post 246 fast with the ring 240 and a post 247 fast with the ring 216. So the tendency of this spring is to restore the ring 240 to a position, relative to ring 216 in which the pawl 217 are free to fly outwardly.

Figure 7:
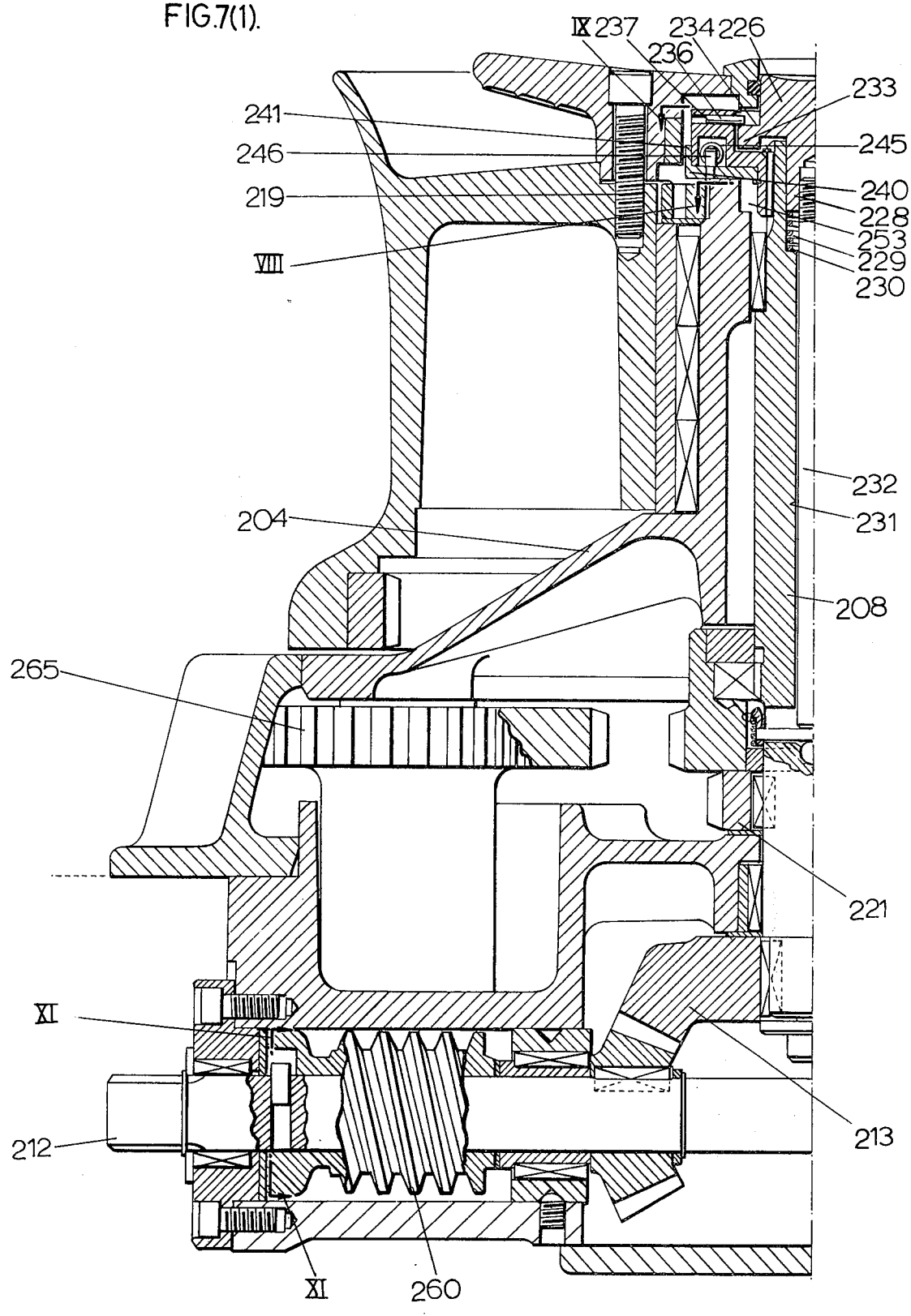
FIG. 7 is a section on two radii, on the lines VII—VII, FIG. 9, through a third embodiment.
Figure 7:
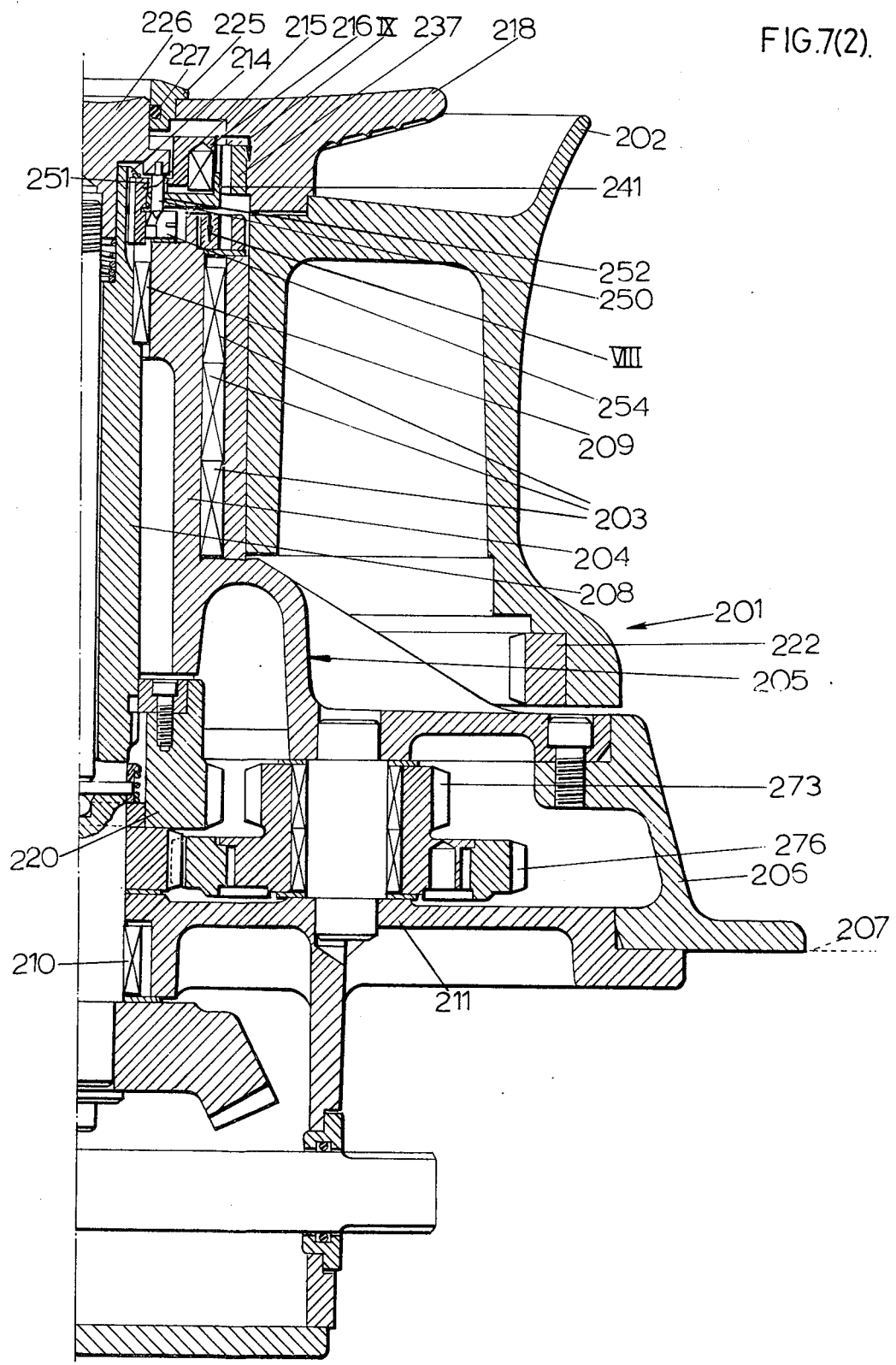
Figure 12:
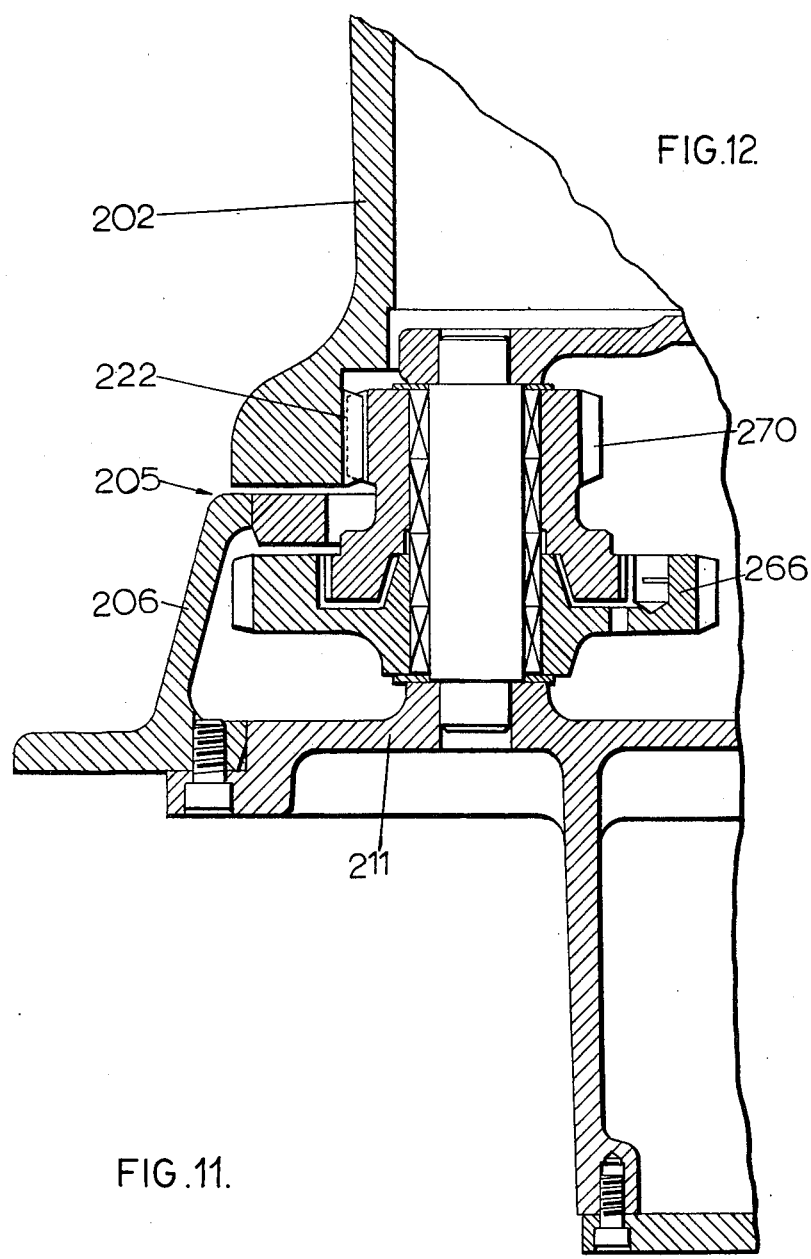
Figure 11:
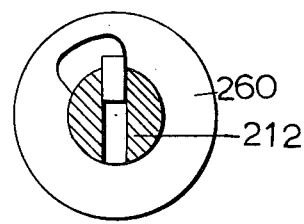
FIG. 11 is a section on the line XI—XI FIG. 7.
Figure 13:
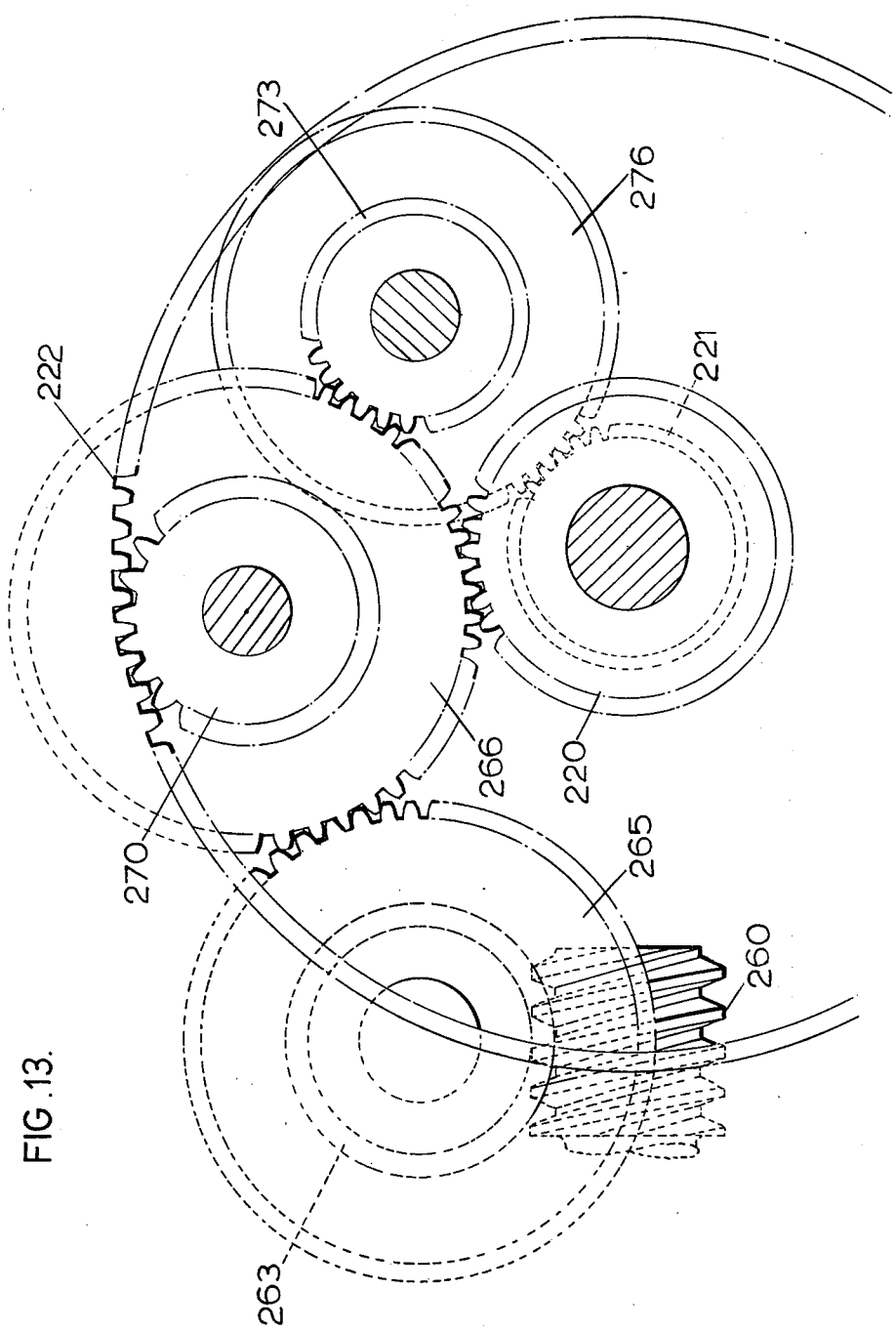
FIG. 13 is a plan view to illustrate the arrangement of the gear trains.

To cause the ring 240 to move to its uncoupling and cocked position in which the spring 245 is extended and the skirt 241 is moved so as to push the pawls inward, there is provided a uni-directional catch. This includes a pin 250 projecting downwardly from the flange 233 of the button 226 through an arcuately elongate slot 251 in the ring 216 and a close-fitting slot 252 in the ring 240 into a track 253 defined by a radially enlarged inner wall of the stem 204 of the casing. In one or more positions (in this embodiment only one is shown) there is provided a pawl 254 pivoted about a stationary axis 255 in the casing 204 and resiliently urged to project inwardly to the full line position shown in FIG. 8. When projecting inwardly its end face intercepts the locus of the pin 250 in the path 253 when the pin is in a downward position, as shown in FIG. 7, so that on rotation of the pin 250 in one direction about the axis of the winch it has to push the pawl radially out of the way against the resilient loading of its spring whereas in the other direction of rotation of the push button 226, with which the pin 250 is fast, the latter will strike the end face of the pawl 254. However this has, extending to below the level where the pin 250 reaches, an inclined face 256 which acts as a ramp so that as well as arresting rotation of the pin 250 in that direction it will also urge the pin 250 upwardly. It is to be remembered that the pawl 254 is pivoted on a stationary part and so it is not operative merely on relative rotations of rotating parts but only upon an appropriate absolute direction of rotation of the pin 250.

Rotation of the ring 240 is caused as will now be described, remembering that the pin 250 will carry the ring 240 with it in rotation because of the engagement between it and the slot 252 in the ring 240.

To engage the 1:1 drive, the operator depresses the push button 226. This brings the projecting pin portions 236 to about the level of the upper surface 234 of the flange 233 of the push button so that there is no detent acting between the flange 233 and pawl ring 216, the spring 245 is free to release potential energy by contracting thus rotating the ring 240 relative to the ring 216 to bring the apertures 242 to the position shown in FIG. 9 so that the pawls 217 project. The limit of such rotation is in this embodiment governed by the pin 250 coming up against an end of the slot 251, but could be determined by the spring 245 becoming solid. After this rotation of the ring 240, when the shaft 208 is driven in the appropriate direction 1:1 drive will be transmitted through those pawls to the drum.

The same depression of the button causes the pin 250 to project down as shown in FIG. 7 so that its path will interfere with the pawl 254. As long as the rotation continues which represents transmission of 1:1 drive through the unidirectional pawls 17 the pin 250 merely clicks past the pawl 254, i.e., the pin 250 is executing a clockwise orbit as is seen in FIG. 8.

To engage the next speed however the operator will reverse the direction of the input drive in the input shaft 212, having the effect of reversing the direction of rotation of the shaft 208 and the drive is immediately taken up between that shaft and the drum by one of the gear train pinions 220, 221. However, when the operator once again reverses his drive he will want to go not to the first speed ratio, here 1:1, but to the third speed ratio which is available and the actuator arrangement which has been described performs this automatically. The pin 250 is still in its lowered state as seen in FIG. 7. When the second drive ratio is engaged it is being carried round with the drive shaft 208 in now an anticlockwise orbit as seen in FIG. 8. When the pin comes up against the pawl 254 the latter first arrests the rotation of the push-button 226 so that there is relative travel of the pin portion 236 over the faces 234 of the flange 233 of that button and at the same time there is extension of the spring 245. This continues until such time as the pin portions 236 arrive over the slots 235 when the ramp action of the end face 256 of the pawl positively urges the button 226 axially upwardly so that the pin portions 236 positively engage the slots 235. This cocking action of the spring 245 is due to the positive rotation of the pawl ring 216 which is splined positively to the portion 214 of the shaft 208, coupled with the retention of the ring 240 by the pin 250. At the same time this same upward movement of the button 226 as the pins 236 engage in the slots 235 raises the pin 250 until it is clear of the upper face of the pawl 254 and the whole assembly is then free to rotate with the shaft 208 in its new direction and with the pawl 217 held retracted by the skirt 241 so that a second drive ratio, through gear train 220, 266, 270 to gear ring 222 on the inner face of the drum. When there is subsequent second reversal of the direction of rotation of the drive shaft 208 the 1:1 drive pawls remain inactive and the third ratio (gear train 221, 276, 273, 266, 270 to gear ring 222) of the winch becomes engaged unless, of course, the operator has intervened and once again depressed the button 226.

An arrangement such as that of pawl 217 may be used to interact directly with the pin 128 of the second embodiment, in place of the unidirectionally rotatable camming ring 130 and pawl 132.

Upon a third reversal of the drive, a worm 260 can allow reversal of the drum by a drive taken through gears 263 and 265 to gears 266, and 270, the second drive ratio being disconnected. This is fully described in our said copending United Kingdom patent application.

I claim:

1. A multi-speed winch having a plurality of drive ratios available between a central drive shaft and the winch drum, in which the drum is rotated always in one direction but with different drive ratios from the drive shaft when the drive shaft is successively rotated in successively opposite directions without manual gear changing or selection interventions once the initial ratio has been chosen wherein a first ratio drive is engageable unidirectionally between a drive shaft and a drum or held uncoupled in accordance with the relative position of a resiliently loaded actuator which is resiliently loaded towards an engagement position in which there will be engagement of the unidirectional first ratio drive but is releasably held by a detent in an uncoupling position where there is uncoupling of the first ration drive, and means accessible to the operator of the winch for releasing the actuator from the detent to be moved by the resilient loading towards the engagement position, the winch further including a catch on a static portion of the winch for engaging the actuator only when the actuator moves with the drive shaft in one absolute direction of rotation and is in engagement position and urging it relative to the shaft and against its resilient loading to its uncoupling position in which the first ratio drive is held uncoupled and it is held by the detent, in which uncoupling position the actuator becomes disengaged from the catch.

2. A winch according to claim 1 wherein the actuator is constrained to perform rotational movement and includes means for holding pawl elements in a disengaged condition when in its uncoupling position, the resilient loading means being a spring of which one end is fast with the actuator means and of which the other end is fast with means bearing pawl elements of the first ratio drive, movement of the actuator towards its uncoupling position involving an increase in potential energy in the spring.

3. A winch according to claim 2 wherein the actuator is constrained to perform only rotational movements and the spring is a tension spring disposed generally tangentially of the axis of the drive shaft.

4. A winch according to claim 3 wherein the detent consists of a recess in an end cap of the winch, and the actuator bears a stud releasably engageable in the said recess to be held against rotational movement of the actuator by a sidewall of the recess, and the means accessible to the operator include a push button at an outer surface of the end cap of the winch depressible to move the stud out of the recess.

5. A winch according to claim 4 wherein the stud is one end portion of a stem extending in an axial direction and urged by resilient means to cause the stud to enter the recess when the stud and recess are in register, an other end portion of the stem comprising a portion of the actuator of which the lock are such as to interfere with the catch means when the stud is out of the recess and to be clear of the catch means when the stud is engaged in the recess.

6. A winch according to claim 1 wherein release of the actuator from the detent involves axial movement of at least an element constrained to rotate with the actuator so that the said element has different loci around the axis of the drive shaft when the actuator is in its engagement or uncoupling positions respectively, the locus of said element when the actuator is in its engagement position interfering with catch means which are non-rotatable around the axis of the drive shaft.

7. A winch according to claim 6 wherein the said element is at least a portion of the actuator.

8. A winch according to claim 7 wherein the catch means includes a pawl mounted on a stationary portion of the winch and arranged to permit unidirectional movement of the said portion of the actuator when in the engagement position.

9. A winch according to claim 8 wherein the catch means includes a member rotatable about the axis of the drive shaft and having at least one projection on one surface, the at least one projection lying in the said locus of the said portion, and the pawl acting to prevent rotation of the said element in one direction.

10. A winch according to claim 8 wherein the pawl lies in the said locus of the said portion of the actuator to engage directly with the said portion.

11. A winch according to claim 10 wherein the pawl has an end face including a portion inclined to the direction of the axis of the drive shaft and adapted to urge the said portion of the actuator in an axial direction out of its said locus.

12. In a winch having more than two drive ratios between a central drive shaft and a winch drum, which are engageable successively opposite rotations of the drive shaft to drive the drum in a single direction and having means for automatically uncoupling a first speed ratio drive upon a first reversal of the drive shaft, including an actuator for causing the said uncoupling and movable to an uncoupling position and to an engagement position in which latter position the first speed ratio drive may be engaged, the improvement comprising means resiliently urging the said actuator towards its engagement position from its uncoupling position and means on a static part of the which effective upon rotation of the drive shaft in one direction only to urge the actuator to its uncoupling position against the continuous opposition of the resilient means.

13. The improvement claimed in claim 12 wherein the actuator is releasable to be moved by said resilient urging means upon actuation of a push button at an end portion of the winch.

14. The improvement claimed in claim 12 wherein the actuator is brought to its uncoupling position and the resilient urging means is brought to a condition of higher potential energy upon first reversal of the drive shaft.

15. The improvement claimed in claim 12 further comprising a push button on an end face of the winch, the actuator being rotatable relative to the push button about the axis of the central drive shaft, a detent for holding the actuator in its uncoupling position against the urging of the resilient means, the push button being operable to release the actuator from the said detent and allow the actuator to rotate relative to the button and move to its engagement position.

16. The improvement claimed in claim 15 wherein the first speed ratio is a 1:1 ratio.

* * * * *